Figures 1, 2:
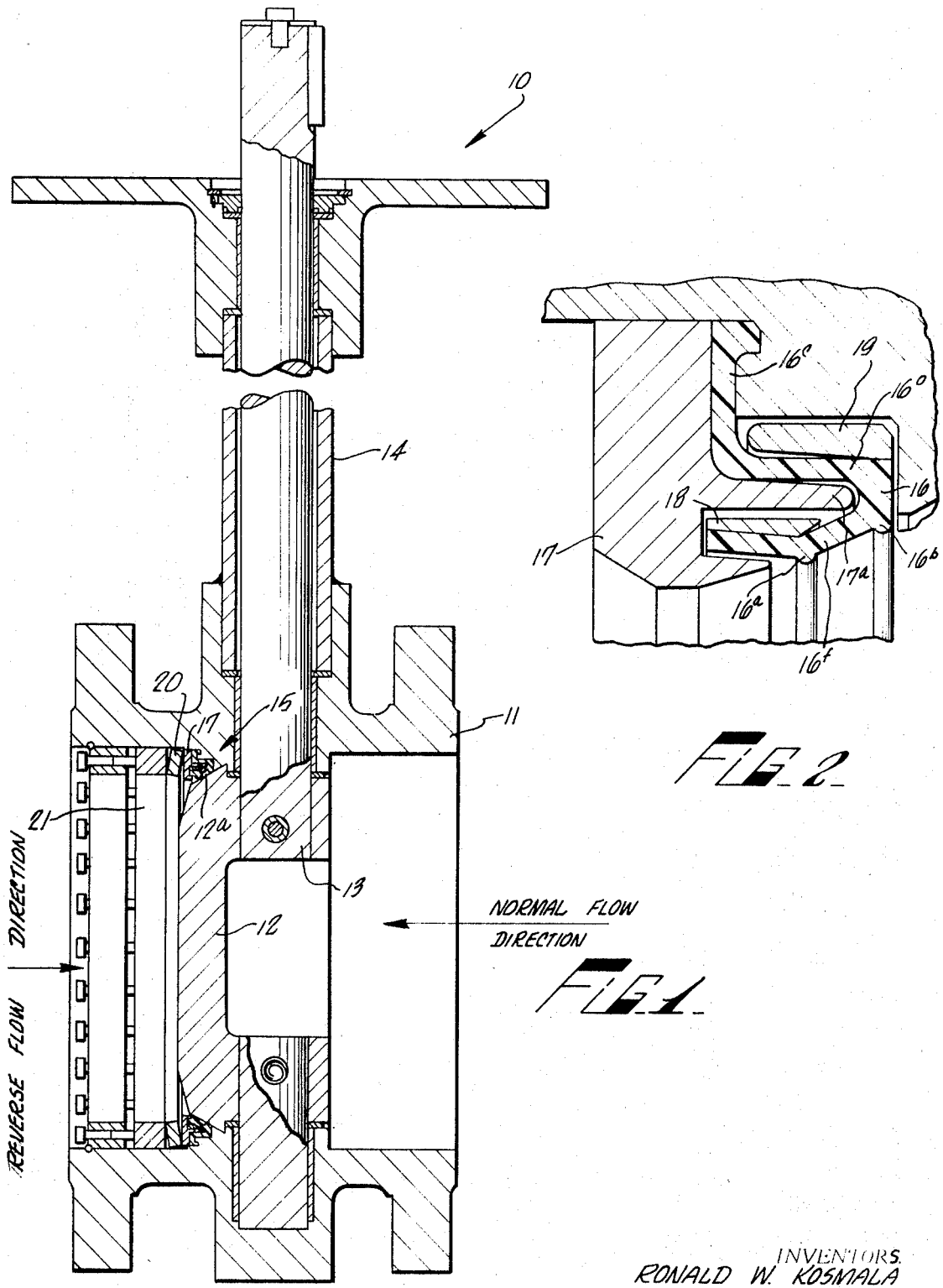

United States Patent
Kosmala et al.

[15] 3,650,508

[45] Mar. 21, 1972

[54] BI-DIRECTIONAL VALVE FOR CRYOGENIC FLUIDS

[72] Inventors: Ronald W. Kosmala, La Mirada; Ritchie W. Whitaker, Claremont, both of Calif.

[73] Assignee: Royal Industries, Inc., Pasadena, Calif.

[22] Filed: Feb. 6, 1969

[21] Appl. No.: 797,166

[52] U.S. Cl. ............................251/174, 251/173, 251/307
[51] Int. Cl. ..........................................................F16k 5/14
[58] Field of Search ..........................251/174, 173, 172, 307

[56] References Cited

UNITED STATES PATENTS

| | | | |
|---|---|---|---|
| 3,069,128 | 12/1962 | Grove | 251/173 |
| 3,077,331 | 2/1963 | Burtis | 251/173 |
| 3,144,040 | 8/1964 | White | 251/307 X |
| 3,156,445 | 11/1964 | Swain | 251/307 X |
| 3,204,924 | 9/1965 | Bredtschneider | 251/174 |
| 3,260,496 | 7/1966 | Borcherdt | 251/307 X |
| 3,282,558 | 11/1966 | Swain | 251/173 X |

*Primary Examiner*—Clarence R. Gordon
*Attorney*—Christie, Parker & Hale

[57] ABSTRACT

This invention is directed to a valve adapted for bi-directional thermally responsive sealing means having a pair of spaced bead-like projections for engaging a valve disc in leak-proof fashion. The bidirectional seal is provided with means for mechanically loading the sealing means for maintaining a substantially constant pressure on the sealing means to provide an essentially constant sealing load with temperature changes.

12 Claims, 2 Drawing Figures

Patented March 21, 1972

3,650,508

INVENTORS.
RONALD W. KOSMALA
RITCHIE W. WHITAKER
BY
Christie Parker Hale
ATTORNEYS.

BI-DIRECTIONAL VALVE FOR CRYOGENIC FLUIDS

This invention relates to valve structures and more particularly to cryogenic and special fluid handling valves having improved sealing structures.

The present invention is an improvement over the valve structures disclosed and claimed in U.S. Pat. No. 3,260,496 granted July 12, 1966. The patented structure disclosed in said U.S. patent is particularly adapted for controlling the flow of cryogenic fluids including liquid and gaseous hydrogen, nitrogen, oxygen and methane, as well as many other ambient temperature bipropellents and corrosive fluids. The structures incorporated in such cryogenic valves provide virtually leak-proof action as a result of the advanced sealing means incorporated in the valve. The dynamic sealing means employed in such a valve is temperature sensitive and includes thermally responsive force exerting means to load the sealing means as a function of temperature through the use of selected expansible materials. The static seal arrangement is such that regardless of thermal expansion or contraction of the sealing means, a constant sealing load is applied thereto to provide the desired virtually leak-proof sealing action. The particular seal disclosed in said U.S. Pat. No. 3,260,496 is constructed and defined to allow only unidirectional sealing across the passageway with which the valve is employed. Stated differently, the configuration of the sealing means is such that it does not allow for fluid sealing in both directions without excessive leakage in the reverse pressure direction.

The present invention provides an improved valve for handling cryogenic fluids of the type disclosed in the aforementioned patent with virtually leak-proof action and incorporating improved sealing means allowing for bidirectional sealing action across the valve. The dynamic sealing means is constructed and defined to maintain mechanical and thermal loading on the sealing means to effect the desired sealing arrangement with the valve disc with fluid differential pressure across the valve in both directions. The static sealing means is employed with mechanical responsive loading means to compensate for sealing contractions and expansion effects to maintain an essentially constant sealing load regardless of temperature changes from the cryogenic to ambient temperature range. The configuration of the sealing means is further defined with legs to constrain the seal from blowing out downstream in both directions of the fluid flow. In addition, the bidirectional sealing means comprising the present invention is interchangeable with the standard commercially available unidirectional seals presently employed in the cryogenic valves of the type disclosed in the aforementioned patent. In this respect, the bidirectional sealing means is capable of a long cyclic life as a result of maintaining the desirable thermetic sealing properties and eccentric valve disc of spherical design as the present unidirectional commercially available cryogenic valves.

From a structural standpoint, the improved valve of the present invention comprises a body member provided with a passage for the bidirectional flow and sealing of fluid and having a valve disc rotatably mounted in the passageway for controlling the flow of fluid through the valve disc preferably as a spherical sealing surface defined for coaction with a sealing means to maintain the disc in contact with the sealing means for providing the virtually leak-proof seal. The sealing means is arranged adjacent the rotatable disc and is generally thermally responsive to changes between ambient temperatures and cryogenic temperatures. The thermally responsive sealing means may be constructed of a Teflon material. The static sealing means is arranged with a mechanical responsive loading means for maintaining a constant pressure in the sealing means to provide an essentially constant sealing load for both fluid flow directions regardless of the temperature changes affecting the sealing means. Such mechanical loading means may be in the form of a conventional Belleville spring means.

These and other features of the present invention may be more fully appreciated when considered in the light of the following specification and drawings, in which:

FIG. 1 is a cross sectional view of a valve embodying the present invention; and FIG. 2 is an enlarged cross sectional view of the sealing structure illustrated in FIG. 1.

Now referring to the drawing, the valve which is the subject of the present invention will be examined in more detail. It should be understood that the structural organization of the present invention is similar to that disclosed in U.S. Pat. No. 3,260,496 and inheres all of the advantages of that unidirectional type valve. The present disclosure, then, is directed to the structure of the valve illustrating the bidirectional sealing action of such a valve. The bidirectional valve which is the subject of the present invention will be described as it is embodied in a cryogenic or other special fluid handling valves particularly adapted for handling cryogenic fluids including liquid and gaseous hydrogen, nitrogen, oxygen, and methane, as well as other ambient temperature bipropellents and corrosive fluids which are compatible with the basic valve materials.

The valve 10 as illustrated comprises a valve body 11 mounting a valve disc 12 secured to a valve operator shaft 13. The operator shaft 13 extends through a torque tube 14 in a conventional fashion. The valve disc 12 is arranged with the bidirectional sealing means, generally identified by the reference numeral 15. The valve disc 12 is operated in the usual fashion and can be rotated from a fully closed position to a fully open position. It is illustrated in a fully closed position in FIG. 1. As in the structure disclosed in U.S. Pat. No. 3,260,496, the valve disc 12 is constructed and defined with a sealing surface $12^a$ that is spherically defined to produce the desired sealing action. The valve disc 12 is preferably constructed as a butterfly-type structure and arranged in a slightly offset relationship to the sealing means 15, as well as being offset from its spherical in a direction perpendicular to the flow as in present day cryogenic valves.

The sealing means 15 comprises a sealing disc 16 that is preferably constructed of a Teflon material. It is, of course, well known that Teflon material is temperature sensitive and tends to contract with a decrease in temperature and expand with increases in temperature and thereby effects the sealing qualities provided by such a seal. The seal is further constructed and defined with a pair of dynamic seal beadlike sealing protrusions arranged on the fluid exposed leg $16^f$ of the seal 16 and identified as the beadlike elements $16^a$ and $16^b$. These beadlike elements $16^a$ and $16^b$ are arranged and adapted to engage a sealing surface $12^a$ for the disc 12 when the latter is rotated to a fully closed position (as illustrated) to effect the bidirectional seal in accordance with the fluid flow through the valve body 11. The seal 16 is mounted to a retainer 17 having a configuration conforming to that of the seal 16 for retaining it in its desired position. As is particularly evident from examining FIG. 2, it will be seen that the seal 16 has a generally U-shaped construction in cross section comprising the arms $16^f$ and $16^o$ with an outwardly extending arm $16^c$. In this respect it should be noted that the seal 16 is provided with such a configuration, namely, the provision of the legs $16^c$ and $16^f$ to prevent the seal from blowing out downstream in both fluid flow directions.

The retainer 17 is further defined to limit the radial displacement of the lips $16^a$ and $16^b$ by means of an arm $17^a$. This structure is such that the pressure on top of the outer seal leg $16^o$ plus the mechanical and thermal loading by the outer spring 19 effects the seal at the seal bead $16^b$. The outer spring 19 may be in the form of a metal hoop that is stretched around the seal leg $16^o$ that has springlike characteristics to provide the required mechanical and thermal loading at the seal. This configuration of the seal leg $16^o$ is pressure sensitive under the normal flow direction or the fluid flow direction from right to left as illustrated to effect the seal at seal bead $16^b$. When the fluid flow is in the reverse direction, or from left to right, as illustrated, pressure from the top of the inner seal leg $16^f$ plus the mechanical and thermal loading by the inner spring 18 effects the seal at the seal bead $16^a$. The inner spring 18 may be a metal hoop that is stretched around the inner seal leg $16^f$ to provide the required mechanical and thermal loading of the seal leg. It will be recognized that any other means for mechanically loading the sealing disc 16 may be employed as long as such means has a higher thermal coefficient than the expansion of the disc. The configuration of the seal leg 16' is pressure sensitive under the reverse flow direction to effect the seal at seal bead 16$^a$.

The seal means 15 further comprehends a mechanical responsive loading means 20 arranged with retainer 17 and seal 16. The mechanical responsive loading means 20 is illustrated as a conventional Belleville spring constructed of a beryllium copper and arranged adjacent the retainer 17. The end of the Belleville spring 20 opposite from the retainer 17 engages a loading ring 21 that is secured by means of conventional fasteners, as illustrated. The important feature of this loading means 20, or Belleville spring, is that it compensates for seal contraction and expansion effects and thereby maintains a constant sealing load regardless of the temperature effects either for cryogenic or ambient temperatures. Combined static and dynamic sealing means then provide the virtually leak-proof seal in both directions of fluid flow without danger of the seal blowing out downstream.

A cryogenic valve embodying the present invention has been successfully tested with helium at a temperature of −320° F. under a differential pressure of 720 pounds per square inch across the valve in alternate flow directions with bubble tight zero internal leakage.

It should now be evident to those skilled in the art that the present invention has provided an improved sealing structure particularly adapted for cryogenic valves in which large temperature excursions are experienced and affords an essentially leak-proof seal for bidirectional fluid flow without deleterious effects.

What is claimed is:

1. A valve comprising a body member provided with a passageway for fluids,
    a valve disc rotatably mounted in the passageway for controlling the flow of fluids therethrough,
    bidirectional, thermally responsive sealing means mounted in the passageway of said body member for coaction with said valve disc to seal off the flow of fluids through the body member in both fluid flow directions through the passageway, said sealing means being constructed of a thermally sensitive resilient material and constructed for engaging the edge of the valve disc in leak-proof fashion,
    means for mechanically loading the sealing means to effect a seal at the edge of the valve disc, and
    mechanical responsive means mounted adjacent said sealing means and providing a sealing load to compensate for the expansion and contraction of said sealing means in response to temperature changes to provide an essentially constant sealing load.

2. A cryogenic valve as defined in claim 1 wherein said rotatable disc has a spherical sealing surface defined for coaction with the sealing means to maintain the disc in contact with the sealing means.

3. A cryogenic valve as defined in claim 2 wherein said rotatable disc is a butterfly valve arranged slightly offset from the sealing means.

4. A valve comprising a body member provided with a passageway for fluids,
    a valve disc rotatably mounted in the passageway for controlling the flow of fluids therethrough,
    bidirectional, thermally responsive sealing means mounted in the passageway of said body member for coaction with said valve disc to seal off the flow of fluids through the body member in both fluid flow directions through the passageway, said sealing means being constructed of a thermally sensitive resilient material and constructed and defined to have a pair of spaced beadlike projections for engaging the edge of the valve disc in leak-proof fashion,
    spring means for mechanically loading the sealing means to effect a seal at said bead-like projections,
    mechanical responsive spring means mounted adjacent said sealing means and providing a sealing load to compensate for the expansion and contraction of said sealing means in response to temperature changes to provide an essentially constant sealing load.

5. A valve as defined in claim 4 wherein said sealing means is further constructed and defined to constrain the seal from blowing out downstream in both directions of fluid flow.

6. A valve as defined in claim 5 wherein said sealing means has a geometrical configuration for defining unbalanced pressures on the sealing means to render the sealing means pressure sensitive in both directions of fluid flow.

7. A valve as defined in claim 5 wherein said sealing means includes a seal constructed of Teflon.

8. A valve as defined in claim 4 wherein said first mentioned spring means comprises individual spring means for mechanically loading each of said beadlike projections.

9. A valve as defined in claim 8 wherein said valve disc has a spherical sealing surface defined for sealing coaction with the sealing means.

10. A valve as defined in claim 9 wherein said valve disc is a butterfly valve arranged slightly offset from the sealing means.

11. A valve as defined in claim 4 wherein said mechanical responsive spring means comprises a Belleville spring.

12. A valve as defined in claim 11 including retaining means for said spring means.

* * * * *